United States Patent
Yamauchi

(10) Patent No.: US 8,904,235 B2
(45) Date of Patent: Dec. 2, 2014

(54) ONLINE DEBUG SYSTEM AND ONLINE DEBUG METHOD FOR INFORMATION PROCESSING DEVICE

(75) Inventor: Shinichiro Yamauchi, Fujisawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 267 days.

(21) Appl. No.: 13/520,047

(22) PCT Filed: Jan. 12, 2011

(86) PCT No.: PCT/JP2011/050361
§ 371 (c)(1),
(2), (4) Date: Jun. 29, 2012

(87) PCT Pub. No.: WO2012/095960
PCT Pub. Date: Jul. 19, 2012

(65) Prior Publication Data
US 2013/0139001 A1    May 30, 2013

(51) Int. Cl.
*G06F 11/00*    (2006.01)
(52) U.S. Cl.
USPC .......................................................... 714/27
(58) Field of Classification Search
CPC .............. G06F 11/366; G06F 11/0739; G06F 11/0748; G06F 11/362; G06F 11/3664
See application file for complete search history.

(56) References Cited

U.S. PATENT DOCUMENTS

| | | | |
|---|---|---|---|
| 7,660,412 B1 * | 2/2010 | Lee | 380/2 |
| 7,992,042 B2 * | 8/2011 | Todoroki et al. | 714/34 |
| 8,423,829 B2 * | 4/2013 | Yamagata et al. | 714/33 |
| 2002/0046399 A1 * | 4/2002 | Debling | 717/138 |
| 2005/0223298 A1 | 10/2005 | Higuchi et al. | |

FOREIGN PATENT DOCUMENTS

| | | |
|---|---|---|
| JP | 10 301803 | 11/1998 |
| JP | 11 102308 | 4/1999 |
| JP | 2002 007162 | 1/2002 |
| JP | 2005 275949 | 10/2005 |
| JP | 2007 322377 | 12/2007 |
| JP | 2008 035233 | 2/2008 |
| JP | 2009 266117 | 11/2009 |
| JP | 2010 086318 | 4/2010 |

OTHER PUBLICATIONS

International Search Report issued on Aril 12, 2011 in PCT/JP11/50361 filed on Jan. 12, 2011.

* cited by examiner

*Primary Examiner* — Charles Ehne
(74) *Attorney, Agent, or Firm* — Oblon, Spivak, McClelland, Maier & Neustadt, L.L.P.

(57) ABSTRACT

An online debug system for an information processing device is provided that enables easily connecting a debug device for online debugging to an information processing device while maintaining minimum required functions of the information processing device as a product. The online debug system has a debug device that transfers a directive from outside to thereby debug a navigation system. The navigation system includes a debug daemon that debugs the navigation system and a data expansion unit that reads a communication driver group stored in a USB memory via a connection terminal and validates it. A serial communication driver as the communication driver group validated in the navigation system enables the debug device communicate with the debug daemon.

12 Claims, 6 Drawing Sheets

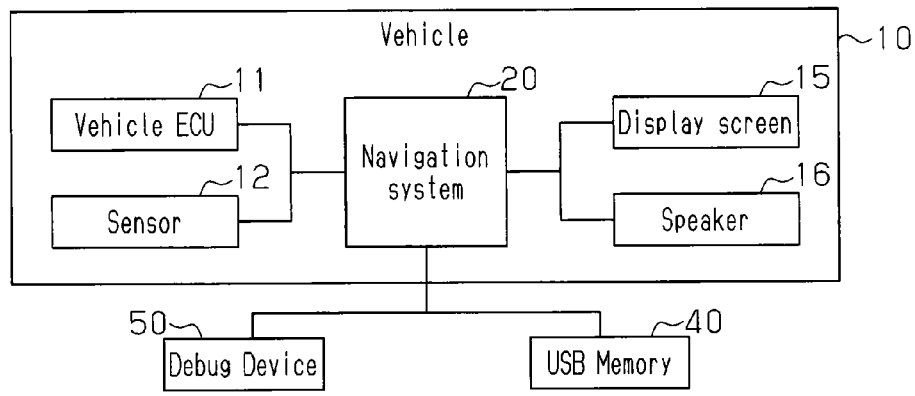
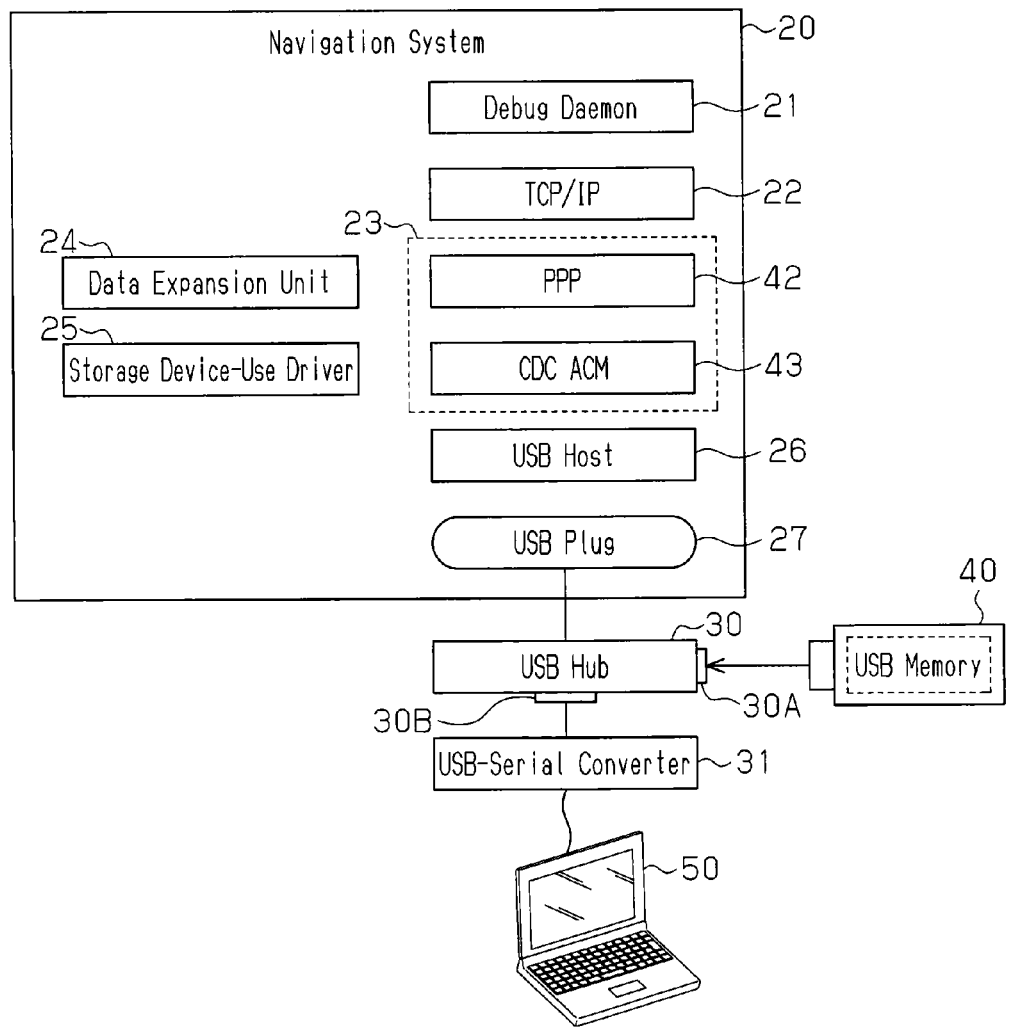

Fig.3(a)
| No | Software Part No. | Vehicle Type | Destination | Available Communication Interface | Communication Driver Group |
|---|---|---|---|---|---|
| 1 | 123_456 | xxx | North America | USB | PPP/CDC ACM |
| ⋮ | ⋮ | ⋮ | ⋮ | ⋮ | ⋮ |
Fig.3(b)
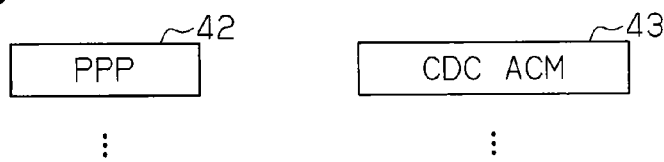
Fig.4
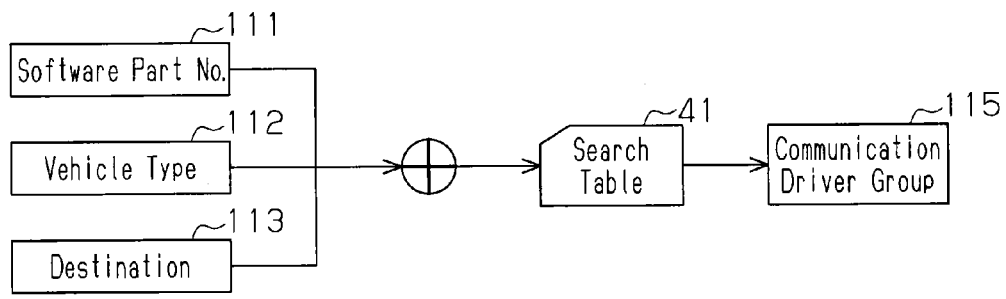

ONLINE DEBUG SYSTEM AND ONLINE DEBUG METHOD FOR INFORMATION PROCESSING DEVICE

FIELD OF THE DISCLOSURE

The present invention relates to an online debug system and online debug method for an information processing device that is mounted, for example, in a vehicle.

BACKGROUND OF THE DISCLOSURE

Generally, when testing an operation state and the like of an information processing device, a testing instrument is externally connected to the information processing device. For example, a testing instrument (external processing device) is connected to a vehicle fault diagnosis device described in Patent Document 1 via a communication path (external communication path) when the vehicle fault diagnosis device conducts a function test on the information processing device including the diagnosis device. The testing instrument is supplied by the information processing device with results and the like of analysis regarding fault information in the information processing device and, in return, commands the information processing device to add fault cause identification means based on a tree principle for identifying the cause for faults in the information processing device, deletes the added fault cause identification means from the information processing device, or sets up for transferring the information processing device into a test mode. As a result, a test directed by the testing instrument can be conducted in the information processing device as necessary and, when the test is unnecessary, the testing instrument can be removed from the information processing device.

Further, in development of an information processing device, it is indispensable to execute software in the device while monitoring the execution state of the software in real time and also perform online debugging so that the software can be modified as necessary while being executed. Like the vehicle fault diagnosis device described in Patent Document 1, such online debugging is accompanied by externally connecting a testing instrument, in this case, a "debugging instrument" to the information processing device. That is, an online debugging device provided separately from the information processing device is connected to the information processing device via a debugging communication path.

For example, when debugging a navigation system, which is one of a vehicle-mounted information processing device, during its development, as shown in FIG. 12(a), a debug daemon 61, which is software for providing the navigation system 60A with debug functions, is connected to a debug device 50 outside a vehicle in a communicable manner. Then, in the navigation system 60A, between the debug daemon 61 and the debug device 50, a communication path that enables communication based on a protocol generated by TCP/IP62 is established via an Ethernet interface 64 or the like that is made usable by an Ethernet driver 63.

PRIOR ART DOCUMENT

Patent Document

Patent Document 1: Japanese Laid-Open Patent Publication No. 2007-322377

SUMMARY

Problems that the Invention is to Solve

Recently, there have been many cases where a debugging communication path for development is removed from an information processing device after the development in order to reduce its size and costs as a product. That is, as shown in FIG. 12(*b*), after being developed, a navigation system 60B has the Ethernet interface 64 deleted from it in order to reduce its size and costs and is shipped in a condition where it cannot be connected with the debug device 50. Accordingly, in the navigation system 60B, which cannot be connected to the debug device 50, its software cannot be debugged once it is shipped, so that it is difficult to understand the operation state or the like of the navigation system 60B when it is utilized in a vehicle or the like.

Such a problem is mostly common not only to vehicle-mounted information processing devices such as navigation systems but also to such information processing devices in which the debugging communication path may be removed from them after the development in order to reduce its size and costs.

In view of the above, the present invention has been developed, and it is an objective of the present invention to provide an information processing device for use with an online debug system and online debug method for enabling easy connection of a debug device for online debugging of an information processing device while maintaining minimum required functions of the information processing device as a product.

Means for Solving the Problems

Means for solving the above objectives and advantages thereof will now be discussed.

To solve the above problems, the present invention provides an online debug system for an information processing device. The system has an information processing device and a debug device for debugging the information processing device online from outside. The information processing device has a connection terminal to which a storage device is connected so that the information processing device can acquire data stored in the storage device. The information processing device has a debug performing unit for debugging software to be executed in the information processing device based on a directive from the outside and a data expansion unit for validating the data read from the storage device. The data stored in the storage device has a communication driver group that permits the debug performing unit to communicate with the outside via the connection terminal. When the communication driver group is read from the storage device connected to the connection terminal and validated by the data expansion unit, the validated communication driver group enables communication between the debug performing unit and the debug device that is connected to the connection terminal and transfers the directive from outside of the information processing device.

To solve the above problems, the present invention provides an online debug method for an information processing device. The method enables debugging on the information processing device online based on a directive transferred from an outside debug device. The information processing device has a connection terminal to which a storage device is connected so that the information processing device can acquire data stored in the storage device. The method includes: providing the information processing device beforehand with a debug performing unit for debugging software to be executed in the information processing device based on the directive from the outside and a data expansion unit for validating the data read from the storage device, and also storing, in the storage device beforehand, a communication driver group that permits the debug performing unit to communicate with the outside via the connection terminal; validating the communication driver group read by the data expansion unit from the storage device connected to the connection terminal; and enabling communication between the debug device and the debug performing unit by using the validated communication driver group.

In such a configuration or method, the communication driver group stored in the storage device is validated after being read via the connection terminal at which the information processing device is connected to the debug device into the information processing device from the storage device when the debug device is utilized. That is, a region required by the information processing device to execute the communication driver group is reserved as a debugging communication path only when the debug device is utilized. As a result, even in the case of the information processing device in a condition where the debugging communication path for development is removed because the information processing device is going to be shipped as a product, the software to be executed by the information processing device can be debugged even after it is shipped. Further, the interface and the like including the communication path required to connect the debug device to the information processing device can be omitted from the information processing device itself after being shipped.

The online debug system is preferably configured such that: the data stored in the storage device has a list denoting the communication driver group that corresponds to the information processing device and the communication driver groups registered in the list, and that the data expansion unit references the list to thereby select the communication driver group that is specified as corresponding to the information processing device, reads the selected communication driver group from the storage device, and validates the selected communication driver group.

The online debug method preferably includes: storing, in the storage device beforehand, a list denoting the communication driver group that corresponds to the information processing device and the communication driver groups registered in the list, and causing the data expansion unit to reference the list to thereby select the communication driver group that is specified as corresponding to the information processing device, read the selected communication driver group from the storage device, and validate the selected communication driver group.

In such a configuration or method, even in a case where the different communication driver group is applied to the different information processing device, the information processing device can select an appropriate communication driver group to enable the connection terminal to communicate with the debug device.

The online debug system is preferably configured such that the connection terminal is composed of a first connection terminal and a second connection terminal that can be used simultaneously, so that, when the storage device is connected to the first connection terminal, the communication driver group read from the storage device into the information processing device is validated for the second connection terminal and the debug device is connected to the second connection terminal.

The online debug method preferably includes: preparing a first connection terminal and a second connection terminal as the connection terminal; connecting the storage device to the first connection terminal to thereby validate, for the second connection terminal, the communication driver group read from the storage device into the information processing device; and connecting the debug device to the second connection terminal.

In such a configuration or method, by respectively using the plurality of connection terminals of the information processing device, a step is omitted such as connection switchover from a state of connection between the information processing device and the storage device to a state of connection between the information processing device and the debug device. Therefore, such a debug device can be easily connected to the information processing device.

The online debug system is preferably configured such that the connection terminal is expanded to a first connection terminal and a second connection terminal, so that, when the storage device is connected to the first connection terminal, the communication driver group read from the storage device into the information processing device is validated for the second connection terminal and the debug device is connected to the second connection terminal.

In a case where the connection terminal of the information processing device can be expanded into a plurality of connection terminals in such a manner, by respectively using the plurality of connection terminals, a step is omitted such as connection switchover from a state of connection between the information processing device and the storage device to a state of connection between the information processing device and the debug device. Therefore, such a debug device can be easily connected to the information processing device.

The online debug system is preferably configured such that, when the storage device is detached from the first connection terminal, communication is canceled between the debug performing unit and the debug device connected to the second connection terminal, and the communication driver group is invalidated for the second connection terminal.

The online debug method preferably includes: detaching the storage device from the first connection terminal to thereby cancel communication between the debug performing unit and the debug device connected to the second connection terminal, and invalidating the communication driver group for the second connection terminal.

In such a configuration or method, validation of the communication driver group for the second connection terminal that is started by connecting the storage device to the first connection terminal in order to connect the debug terminal to the information processing device is ended by detaching the storage device from the first connection terminal. As a result, online debugging on the information processing device by use of the debug terminal can be reliably managed by attaching the storage device to and detaching it from one of the connection terminals of the information processing device. Therefore, management can be easily performed reliably on the performance of the online debug in such an information processing system.

The online debug system is preferably configured such that the storage device and the debug device are configured as an integral device in which they share a terminal to be connected to the connection terminal.

In such a configuration, it is possible to manage the storage device and the debug device easily.

The online debug system is preferably configured such that the connection terminal is of the serial bus standard.

In such a configuration, a communication path based on a typical standard can be used to establish communication among the information processing device, the storage device, and the debug device, so that fewer restrictions are imposed on the debug device that can be connected to the information processing device. As a result, the utility value is improved of the online debug system for such an information processing device.

The online debug system is configured such that the connection terminal of the information processing device is of the USB standard, and a USB hub connected to the connection terminal is provided with the first connection terminal and the second connection terminal.

In such a configuration, a hub capable of expanding the connection terminal of the information processing device into a plurality of terminals can be utilized on the communication path among the information processing device, the storage device, and the debug device. Moreover, a USB-standard online debug system capable of applying different communication driver groups to the expanded connection terminals can be applied easily. As a result, the availability and applicable scope of the online debug system for the information processing device is expanded.

The online debug system is preferably configured such that the information processing device is mounted in a vehicle as a vehicle-mounted information processing device.

In such a configuration, the online debug system can be applied so as to perform online debug on the vehicle-mounted information processing device such as a navigation system mounted on a vehicle. Therefore, the navigation system can be debugged online by a car dealership and the like. As a result, it is possible to quickly respond to a sense of discomfort of the user on the information processing device, thereby improving convenience of the online debug system for the information processing device.

BRIEF DESCRIPTION OF THE DRAWINGS

FIG. 1 is a block diagram showing a schematic configuration of one embodiment of a vehicle including an online debug system for an information processing device according to the present invention;

FIG. 2 is a block diagram showing a schematic configuration of the online debug system for an information processing device shown in FIG. 1;

FIG. 3 are schematic diagrams showing information stored in a storage device shown in FIG. 2, where FIG. 3(a) is an illustrative view of a list of communication driver groups and FIG. 3(b) is a schematic diagram showing communication drivers;

FIG. 4 is a schematic diagram showing a procedure for selecting the communication driver group in the online debug system for an information processing device shown in FIG. 2;

FIG. 10 are schematic diagrams showing a still further aspect of the communication path reserved by the online debug system for an information processing device according to the present invention, where

FIG. 11 are schematic diagrams showing an additional aspect of the communication path reserved by the online debug system for an information processing device according to the present invention, where FIG. 12 are block diagrams showing a schematic configuration of the conventional online debug system for an information processing device, where

Figure 5:
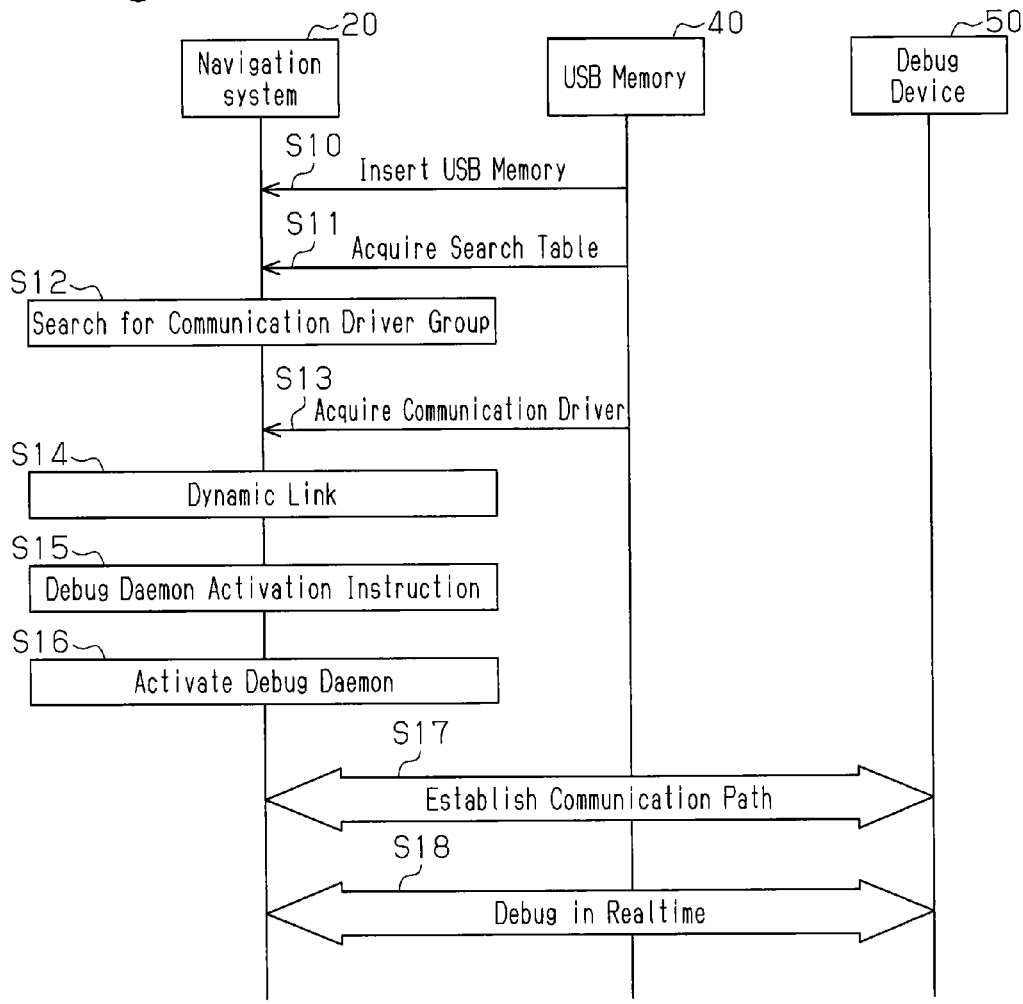
FIG. 5 is a sequence diagram showing operations of the online debug system for an information processing device shown in FIG. 2 to reserve a communication path.

DETAILED DESCRIPTION OF THE PREFERRED EMBODIMENTS (First Embodiment)

Description will be provided of a configuration of an online debug system for an information processing device according to the present invention with reference to FIGS. 1 to 4.

As shown in FIG. 1, the online debug system for an information processing device includes a navigation system 20 as an information processing device mounted in a vehicle 10 and a debug device 50 that is externally connected to the navigation system 20 in a communicable manner to enable operations about online debugging on the navigation system 20. Further, a USB memory 40 as an external storage device used to input software and data into and output from the navigation system 20 is connected to the navigation system 20 in a readable/writable (accessible) manner.

The vehicle 10 is a movable body such as an automobile and mounted with a vehicle ECU11 as a various control devices for vehicle control, a sensor 12 for measuring a vehicle state and the like, the navigation system 20, and the like, which are connected to each other via a vehicle-mounted network so that they can communicate information with each other. The navigation system 20 can acquire various pieces of vehicle information such as a vehicle ID, a vehicle type, and a destination of the vehicle 10 from the vehicle ECU11 via the vehicle-mounted network.

Further, the vehicle 10 is mounted with a display screen 15 and a speaker 16, which are connected to the navigation system 20 and receive output information from the navigation system 20. The display screen 15 receives the output information such as character information and image information from the navigation system 20 and displays them as characters and images, and the speaker 16 receives the output information such as voice information from the navigation system 20 and outputs it as a voice. In such a manner, the output information from the navigation system 20 is provided to a driver and the like via the display screen 15 and the speaker 16.

The navigation system 20 detects the current position of the vehicle 10 as one of the vehicle states of the vehicle 10 by utilizing a global positioning system (GPS) not shown. Then, the navigation system 20 references pre-stored map information based on the detected current position of the vehicle 10, thereby providing the driver and the like with guidance and the like such as a travel route and the like of the vehicle 10 up to its travel destination in an image on the display screen 15 or as audio from the speaker 16.

The navigation system 20 is provided with a computation device (not shown) mainly formed by a microcomputer to process operations such as guidance for a travel route. That is, the computation device includes a CPU for performing various pieces of operational processing, a ROM for storing various control programs, a RAM utilized as a work area for data storage and program execution, and other memories (including nonvolatile memories). Further, the navigation system 20 is provided with a publicly known storage device such as a hard disk, which stores basic software such as the OS of the navigation system 20, route guiding software, online debugging software, and the relating various software pieces and drivers. That is, when activated, first the arithmetic device reads the basic software from the storage device and executes it and then, as necessary, reads the travel route guiding software and the online debugging software from the storage device and respectively executes them. For example, the navigation system 20 performs the basic functions when the basic software is executed and performs travel route guidance when the travel route guiding software is executed.

Further, as shown in FIG. 2, the navigation system 20 includes a debug daemon 21 as a debug performing unit, which is software for debugging the navigation system 20 online, and a TCP/IP 22 for providing a protocol for data communication between the debug daemon 21 and the debug device 50. The debug daemon 21 is software for performing online debug on the software (for example, the route guiding software) that is executed by the computation device in the navigation system 20. The debug daemon 21 can acquire debug related information from the software to be debugged and direct results of the acquisition to the debug device 50 in real time. In return for that, each time the operation is performed, the debug daemon 21 is consecutively supplied from the debug device 50 with a directive relating to the online debug and has it set in it.

Moreover, the navigation system 20 includes a universal serial bus (USB) as an external interface. The USB interface includes a USB plug 27 composed of a USB-standard connection terminal (A-plug) as a terminal for connection so that the USB memory 40 as an external storage device or a USB peripheral device such as the later-described USB hub 30 may be connected to the USB plug 27. A path along which the USB interface is connected to the USB peripheral device connected to the USB plug 27 is managed by a USB host 26 (host controller) in the navigation system 20, so that the USB host 26 reserves a connection path capable of mutual data transfer with the USB peripheral device connected to the USB plug 27. That is, the USB host 26 reserves the connection path when it detects attachment of the USB peripheral device to the USB plug 27 and releases the connection path when it detects detachment of the USB peripheral device from the USB plug 27. In addition, via the reserved connection path, the USB host 26 provides the arithmetic device in the navigation system 20 with a communication path capable of mutual data transfer with the USB peripheral device connected to the USB plug 27.

As a result, the navigation system 20 is made capable of mutual data communication with the USB peripheral device connected to the USB plug 27, for example, the USB memory 40 by way of the USB host 26. Through the data communication, the navigation system 20 recognizes the USB memory 40 as an externally connected storage device (mass storage class) and identifies a storage device-use driver 25 to handle it as a storage device. As a result, by using the storage device-use driver 25, the navigation system 20 can handle the USB memory 40 connected to the USB plug 27 as a readable/writable (accessible) storage device. In the present embodiment, the navigation system 20 is provided with the storage device-use driver 25 to handle the USB memory 40 and the like as a storage device, as standard equipment.

As shown in FIG. 2, a USB hub 30 is connected to the USB plug 27. The USB hub 30 has a function to expand the number of the USB plug 27 so that the USB plug 27 may be supplied with a plurality of connection terminals (A-plugs) having almost the same functions as the USB plug 27. In such a manner, the USB hub 30 has a USB-standard connection terminal (B-plug) that can be connected to the connection terminal (A-plug) of the USB plug 27 of the navigation system 20 as well as a plurality of connection terminals (A-plugs) similar to the USB plug 27. One of the plurality of A-plugs of the USB hub 30 will be referred to as a first connection terminal 30A and another will be referred to as a second connection terminal 30B. The USB host 26 manages the connection paths of the USB peripheral devices respectively connected to the connection terminals (A-plugs) of the USB hub 30 in much the same way as in a case where those USB peripheral devices are directly connected to the USB plug 27, to reserve the connection path capable of mutual data transfer between each of the USB peripheral devices respectively connected to the connection terminals (A-plugs) of the USB hub 30 and the USB plug 27. Further, the USB host 26 provides the arithmetic device in the navigation system 20 with a communication path capable of mutual data communication between each of the USB peripheral devices and the USB plug 27. As a result, by using the storage device-use driver 25, the navigation system 20 can perform read and write operations to a storage region in the USB memory 40 connected to the USB hub 30.

Moreover, the debug device 50 is connected to the USB hub 30 via a USB-serial converter 31. The USB-serial converter 31 converts data received and sent according to the USB standard into data that can be received and sent using a serial communication port. The debug device 50 may be, for example, a personal computer and its serial communication port is connected to a USB-serial converter 31. Further, the debug device 50 can obtain debug-related information through data communication with the debug daemon 21 installed in the navigation system 20, to display it on a screen of the debug device 50 and also give debug-related directives to the debug daemon 21.

To communicate data between the debug daemon 21 and the debug device 50, it is necessary to give a serial communication driver 23 between the TCP/IP 22 and the USB host 26 in the navigation system 20. However, in the present embodiment, the serial communication driver 23 is not installed in the basic software that is installed in the navigation system 20 at the time of shipment (the serial communication driver 23 is denoted by a broken line in FIG. 2). That is, in the present embodiment, the serial communication driver 23 is dynamically built (dynamic-linked) into the navigation system 20 and validated as necessary during the execution of the navigation system 20. Therefore, in ordinary use of the navigation system 20, even if the USB-serial converter 31 is connected to the USB host 26 via the USB hub 30 and the USB plug 27, that is, a connection path is established between the USB host 26 and the USB-serial converter 31, the debug device 50 cannot communicate data with the debug daemon 21 because the navigation system 20 does not have the serial communication driver 23.

As shown in FIGS. 3 (a) and 3(b), the USB memory 40 stores a search table 41 as a list in which a plurality of types of the serial communication drivers 23 required in the navigation system 20 are registered as a communication driver group as well as PPP 42 and CDC_ACM 43 that compose the serial communication driver 23. The search table 41 as well as PPP 42 and CDC_ACM 43 are prepared during the development of the navigation system 20 and stored in the USB memory 40 as necessary by the car dealership and the like.

In the search table 41, the communication interface utilized in connection between the navigation system 20 and the debug device 50 in accordance with the type of the navigation system 20 and the communication driver group that is required when the communication interface is utilized are registered in a condition where they are correlated with each other. As shown in FIG. 3(a), specifically, the search table 41 registers items such as a part number of the software such as the basic software used in decision of the type of the navigation system 20, a vehicle type, a destination of the vehicle 10, an available communication interface, and the communication driver group. For example, the search table 41 registers "123_456" as the software part number, "xxx" as the vehicle type, "North America" as the destination of the vehicle 10, "USB" as the available communication interface, and "PPP/CDC_ACM" as the communication driver group respectively. PPP 42 provides a communication protocol for connecting two points to each other so that they can communicate data with each other. CDC_ACM 43 enables bidirectional serial communication via the USB host 26.

As a result, the serial communication driver 23 stored in the USB memory 40 is built into the navigation system 20 dynamically, to ensure a communication path between the debug daemon 21 and the debug device 50 so that data communication by use of the TCP/IP protocol can be performed as bidirectional serial communication between those two points via the USB host 26.

To ensure such a communication path, the navigation system 20 includes a data expansion unit 24 for reading the serial communication driver 23 (PPP 42 and CDC_ACM 43) stored in the USB memory 40 and dynamically building it into the navigation system 20. The data expansion unit 24 accesses the USB memory 40 connected to the USB plug 27 via the storage device-use driver 25 to thereby acquire the search table 41 from the USB memory 40 and also, as shown in FIG. 4, acquires the vehicle information such as a software part number 111, a vehicle type 112, and a destination 113 from the navigation system 20. For example, in the present embodiment, the data expansion unit 24 acquires "123_456" as the software part number, "xxx" as the vehicle type, and "North America" as the destination respectively from the navigation system 20 and the like. Then, the search table 41 is searched on the basis of the acquired vehicle information, to identify a communication driver group 115 required in the vehicle 10. Then, the data expansion unit 24 acquires the identified communication driver group 115, that is, PPP 42 and CDC_ACM 43 in this case from the USB memory 40 and builds them into the navigation system 20 dynamically. As a result, PPP 42 and CDC_ACM 43 that correspond to the vehicle 10 are built into the navigation system 20 dynamically and validated as the serial communication driver 23.

Figure 6:
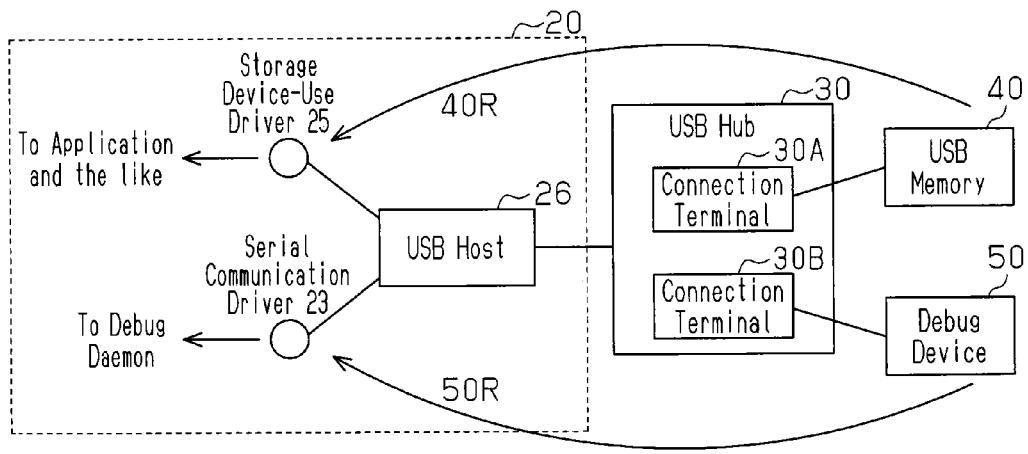
FIG. 6 is a schematic diagram showing the communication path reserved by the online debug system for an information processing device shown in FIG. 2.
Figure 7:
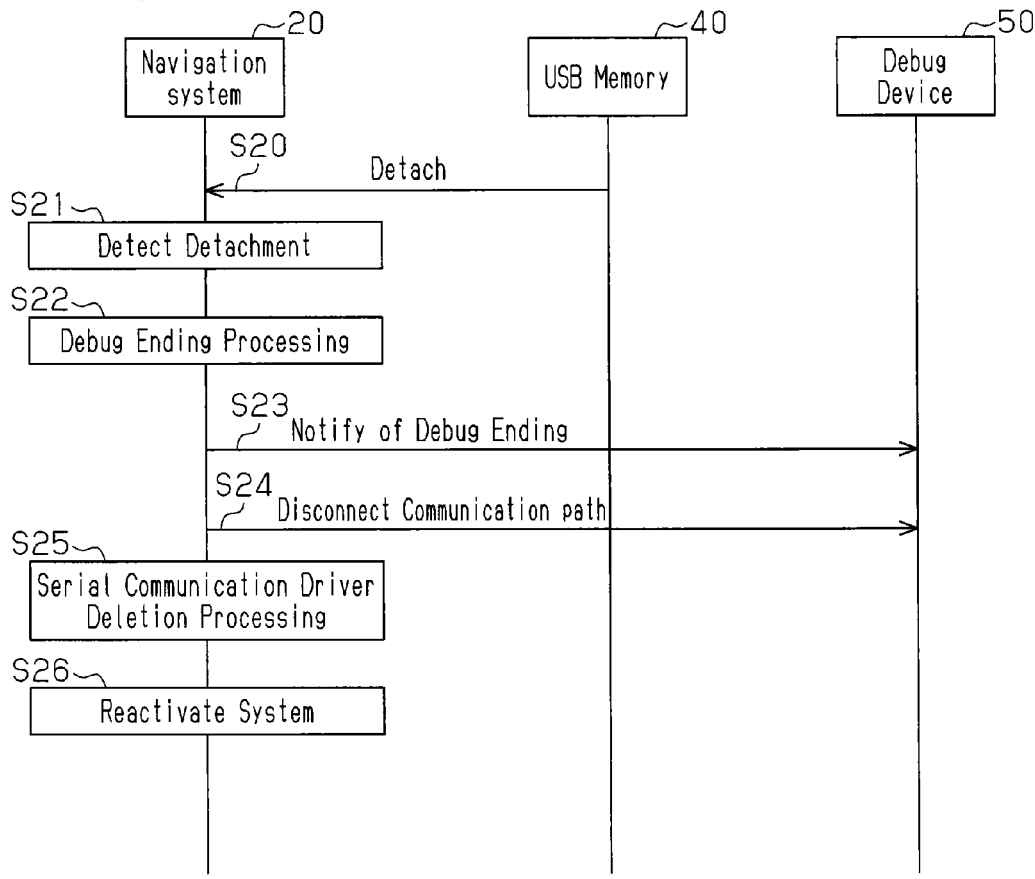
FIG. 7 is a sequence diagram showing operations of the online debug system for an information processing device shown in FIG. 2 to disconnect the communication path.

Next, description will be provided of actions of an online debug system for the information processing device having such a configuration with reference to FIGS. 5 to 7.

As shown in a flowchart in FIG. 5, when detecting that the USB memory 40 is inserted into the USB plug 27 by way of the USB host 26 (step S10 in FIG. 5), the navigation system 20 uses the data expansion unit 24 to acquire the search table 41 from the USB memory 40 (step S11 in FIG. 5). Then, as shown in a communication path diagram in FIG. 6, data can be communicated between the navigation system 20 and the USB memory 40 by using a first communication path 40R composed of the storage device-use driver 25, the USB host 26, and the first connection terminal 30A (A-plug) of the USB hub 30.

When the search table 41 is acquired, the data expansion unit 24 searches the search table 41 to thereby identify the communication driver group 115 suited to the navigation system 20 (step S12 in FIG. 5) and also acquires the identified communication driver group 115 (PPP 42 and CDC_ACM 43) from the USB memory 40 (step S13 in FIG. 5). When PPP 42 and CDC_ACM 43 are acquired, the data expansion unit 24 dynamically builds the acquired communication driver group 115 into (dynamic-links to) the navigation system 20 and validates the driver group 115 (step S14 in FIG. 5). When the communication driver group 115 is dynamically built in completely, the data expansion unit 24 issues an instruction to activate the debug daemon 21 (step S15 in FIG. 5), thereby activating the debug daemon 21 in the navigation system 20 (step S16 in FIG. 5). The activated debug daemon 21 establishes a communication path between itself and the debug device 50 (step S17 in FIG. 5). As a result of the establishment of the communication path, as shown in FIG. 6, data can be communicated between the debug daemon 21 and the debug device 50 by using a second communication path 50R composed of the serial communication driver 23, the USB host 26, and the second connection terminal 30B (A-plug) of the USB hub 30. Then, data communication necessary for online debug is performed between the debug daemon 21 and the debug device 50 via the established second communication path 50R, so that the debug device 50 can debug the navigation system 20 online (real-time debug, step S18 in FIG. 5).

On the other hand, as shown in a flowchart in FIG. 7, if the USB memory 40 is detached from the USB plug 27 (step S20 in FIG. 7), the navigation system 20 detects the detachment of the USB memory 40 by way of the USB host 26 (step S21 in FIG. 7). When detecting the detachment of the USB memory 40, the navigation system 20 performs processing to end online debug, thereby ending the online debug processing by use of the debug daemon 21 (step S22 in FIG. 7). Further, the navigation system 20 notifies the debug device 50 of the ending of the online debug by use of the debug daemon 21, to permit the debug device 50 also to join the online debug ending processing (step S23 in FIG. 7). When the online debug processing by use of the debug daemon 21 ends, the navigation system 20 disconnects the communication path between the debug daemon 21 and the debug device 50 (step S24 in FIG. 7) and then starts processing to delete the serial communication driver 23 (step S25 in FIG. 7). The processing to delete the serial communication driver 23 is performed to return the navigation system 20 to condition where the serial communication driver 23 is yet to be built in it. Specifically, by reactivating the navigation system 20 so that it may read the basic software from which the serial communication 23 is omitted originally, the navigation system 20 is returned to the condition where the serial communication driver 23 is yet to be built in it. That is, in the processing to delete the serial communication driver 23, reactivation of the navigation system 20 is prepared, and when it is prepared, the navigation system 20 is reactivated (step S26 in FIG. 7). As a result, the navigation system 20 is activated in a condition where the serial communication driver 23 is omitted from it, so that ordinary navigation operations can be performed.

As described above, the online debug system for an information processing device according to the present embodiment has advantages described below.

(1) The navigation system 20 utilizes the USB plug 27 serving as a terminal used to connect to the debug device 50, to read the communication driver group 115 from the USB memory 40 and validate the driver group 115 when utilizing the debug device 50. That is, a region required by the navigation system 20 to execute the communication driver group 115 is ensured as a debugging communication path (the first communication path 40R and the second communication path 50R) only when utilizing the debug device 50. As a result, even in such a navigation system 20 that the debugging communication path and the like for development is omitted at the time of shipment or in ordinary use as a product for navigation operations, the software to be executed in the navigation system 20 can be debugged as occasion demands. That is, the interface and the like including the communication path necessary in connection of the debug device 50 can be omitted normally from the navigation system 20 as a navigation system itself.

(2) Even if a different communication driver group 115 is applicable to each of different navigation systems 20, the navigation systems 20 each can select the appropriate communication driver group 115 from the USB memory 40 because the USB memory 40 stores the search table 41. That is, the navigation system 20 can well suitably set the connection terminals, that is, the USB plug 27 and the second connection terminal 30B so that it can communicate with the debug device 50.

(3) The two A-plug connection terminals (the first connection terminal 30A and the second connection terminal 30B) of the USB hub 30 are used. That is, it is possible to satisfy both of a state where the USB memory 40 is connected to the first connection terminal 30A and a state where the debug device 50 is connected to the second connection terminal 30B. Therefore, a labor is omitted of switchover between the state of the USB memory 40 connected to the navigation system 20 and that of the debug device 50 connected to the navigation system 20. Such a debug device 50 can be easily connected to the navigation system 20.

(4) When the USB memory 40 is connected to the first connection terminal 30A, the second connection terminal 30B of the USB hub 30 is validated by the navigation system 20 so that the second connection terminal 30B may be connected to the debug device 50, whereas when the USB memory 40 is detached from the first connection terminal 30A, the second connection terminal 30B is invalidated. As a result, online debugging on the navigation system 20 by use of the debug device 50 can be reliably managed by attaching the USB memory 40 to and detaching it from the first connection terminal 30A. That is, in a state where the USB memory 40 is detached from the first connection terminal 30A, the debug device 50 cannot debug the navigation system 20 even if the debug device 50 is connected to the second connection terminal 30B. Therefore, management can be easily performed reliably on the performance of the online debug in such an online debug system for an information processing device.

(5) Data for debugging is communicated through typical USB-standard communication paths such as the first communication path 40R and the second communication path 50R among the navigation system 20, the USB memory 40, and the debug device 50. Therefore, fewer restrictions are imposed on the debug device 50 that can be connected to the navigation system 20. As a result, the utility value is improved of such an online debug system for an information processing device.

(6) By using a USB interface as a communication path between the navigation system 20 and the USB memory 40, it is possible to utilize the USB hub 30 capable of expanding the connection terminal into a plurality of terminals and also apply the different communication driver groups 115 to the different connection terminals expanded. As a result, it is possible to configure an online debug system for an information processing device easily, thereby expanding its availability and applicable scope.

(7) Online debug is applied to the navigation system 20 that is mounted in the vehicle 10. Therefore, a car dealership and the like can debug the navigation system 20 online. As a result, the car dealership can quickly respond to a sense of discomfort of the user (driver) on the navigation system 20, thereby improving convenience of the navigation system 20, that is, an online debug system for debugging the information processing device online.

(Other Embodiments)

The embodiment described above may be modified as follows.

Figure 8:
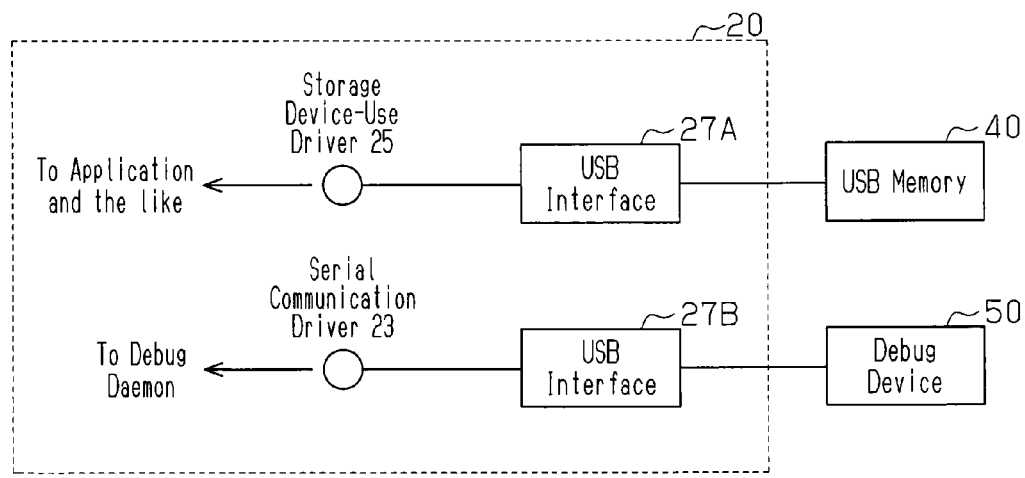
FIG. 8 is a schematic diagram showing another aspect of the communication path reserved by the online debug system for an information processing device according to the present invention.

The embodiment described above exemplifies a case where the USB memory 40 and the debug device 50 share the USB host 26 in use. However, besides it, the navigation system 20 may be configured to accommodate a USB memory and a debug device by using different USB hosts respectively. For example, as shown in FIG. 8, the navigation system 20 may have a first USB interface 27A that is connected to the USB memory 40 and a second USB interface 27B that is connected to the debug device 50. In this case, the first USB interface 27A relays communication between the USB memory 40 and the storage device-use driver 25, while the second USB interface 27B relays communication between the debug device 50 and the serial communication driver 23. In this case, the navigation system 20 only needs to validate a communication driver group acquired from the USB memory 40 for the second USB interface 27B. Further, when detecting that the USB memory 40 is detached from the first USB interface 27A, the navigation system 20 can also disconnect the communication path by way of the second USB interface 27B. As a result, the degree of freedom can be improved of the online debug system for an information processing device.

Although the embodiment described above exemplifies a case where the navigation system 20 is reactivated if the serial communication driver 23 is detached, the method for detaching the serial communication driver 23 is not limited to it. The serial communication driver 23 may be detached dynamically. Such a configuration may be employed that the navigation system need not be reactivated after online debug ends.

The embodiment described above exemplifies a case where the external interface is a USB. However, besides it, the external interface may be an interface of any other standard such as a controller area network (CAN), a serial port, Ethernet (registered trademark), or FlexRay (registered trademark). This will improve the degree of freedom of the configuration of the online debug system for an information processing device.

Figure 9:
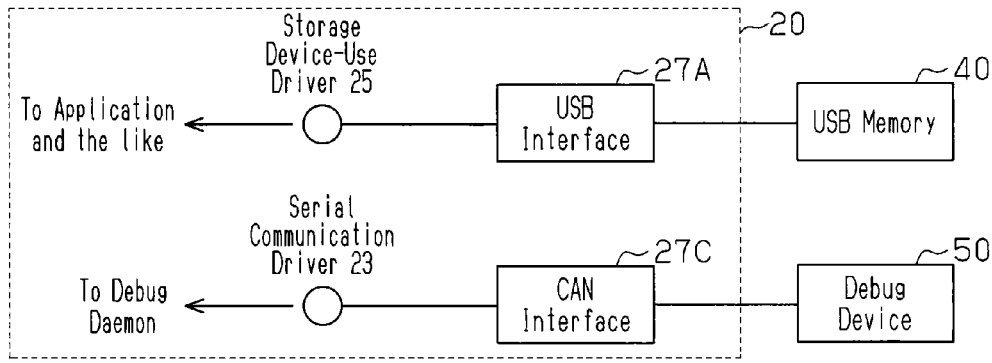
FIG. 9 is a schematic diagram showing a further aspect of the communication path reserved by the online debug system for an information processing device according to the present invention.

The embodiment described above exemplifies a case where both the first connection terminal 30A and the second connection terminal 30B of the navigation system 20 are of the USB standard. However, besides it, the first connection terminal and the second connection terminal may be of different standards. For example, as shown in FIG. 9, the navigation system 20 may have a USB interface 27A as the first connection terminal and a CAN interface 27C as the second connection terminal. For example, the USB memory 40 may be connected to the USB interface 27A and the debug device 50 may be connected to the CAN interface 27C. The navigation system 20 may acquire a serial communication driver 23C for the CAN interface 27C from the USB memory 40 and, at the time of online debugging, validate the acquired serial communication driver 23C. As a result, diversity is ensured for the communication path among the navigation system 20, the USB memory 40, and the debug device 50 to reduce the restrictions for debug devices that can be connected to the navigation system, thereby improving the degree of freedom and the utility value of the configuration of the online debug system for an information processing device.

Figure 10A:
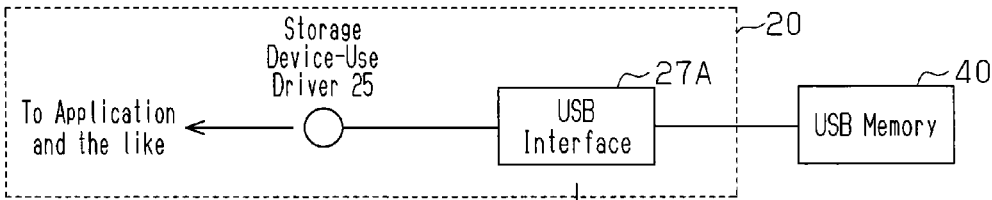
FIG. 10(a) shows a case where a storage device-use driver is validated and FIG. 10(b) shows a case where a serial communication driver is validated.
Figure 10B:
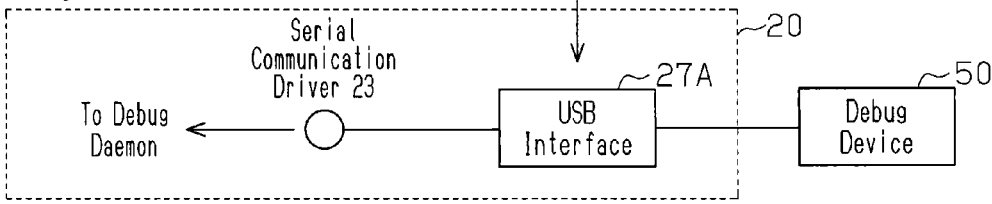

The embodiment described above exemplifies a case where the USB memory 40 is connected to the first connection terminal 30A of the navigation system 20, and the debug device 50 is connected to the second connection terminal 30B of the navigation system 20. However, besides it, one of the connection terminals of the navigation system 20 may be shared by a USB memory and a debug device in use. For example, as shown in FIG. 10(a), at first the navigation system 20 acquires the serial communication driver 23 from the memory 40 via the storage device-use driver 25 validated for the USB interface 27A. Then, the navigation system 20 detaches the USB memory 40 from the USB interface 27A and, as shown in FIG. 10(b), connects the debug device 50 to the USB interface 27A. The navigation system 20 may validate the serial communication driver 23 in place of the storage device-use driver 25 for the USB interface 27A, thereby enabling data communication between the debug daemon 21 and the debug device 50. In FIG. 10(b), the USB-serial converter 31 between the USB interface 27A and the debug device 50 is omitted, so that actually the USB memory 40 in FIG. 10(a) is replaced by the USB-serial converter 31 in FIG. 10(b) as something that is connected to the USB interface 27A. However, a communication path between the debug daemon 21 and the debug device 50 is ensured appropriately by presetting the navigation system 20 so that processing to disconnect the communication path between the debug daemon 21 and the debug device 50 may not be performed when the USB memory 40 is detached from the USB interface 27A. As a result, at least one of the connection terminals of the navigation system 20 connects the USB memory 40 and the debug device 50 to the navigation system 20 safely, so that the online debug system can be applied. This improves the degree of freedom and the utility value of the configuration of the online debug system for an information processing device.

Figure 11A:
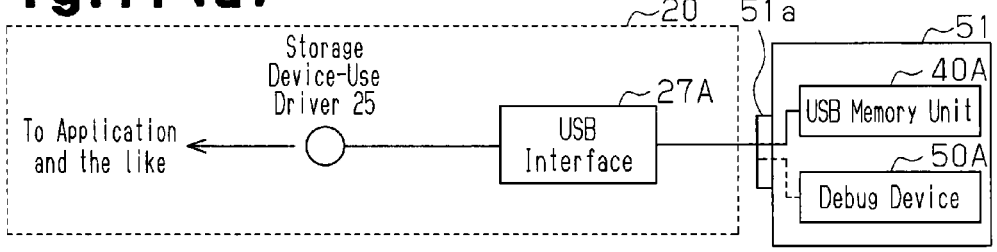
FIG. 11(a) shows a case where the storage device-use driver is validated and FIG. 11(b) shows a case where the serial communication driver is validated.
Figure 11B:
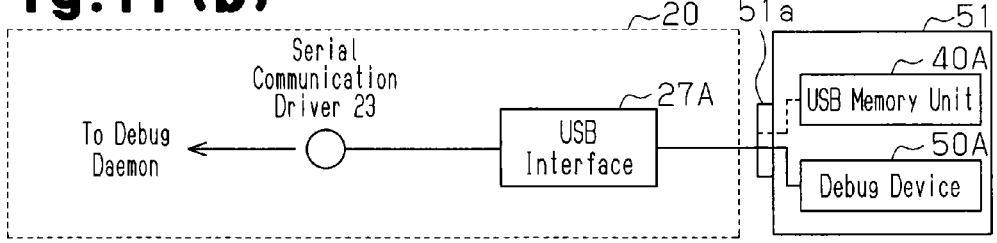
Figure 12A:
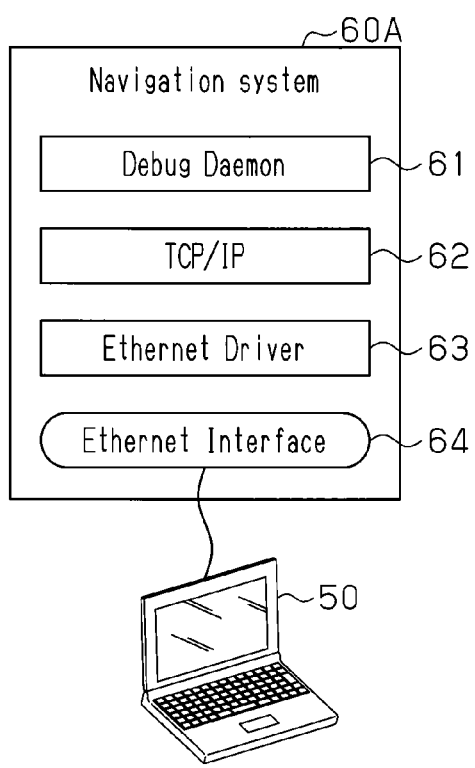
FIG. 12(a) is a block diagram showing an aspect during its development and FIG. 12(b) is a block diagram showing an aspect after the development.
Figure 12B:
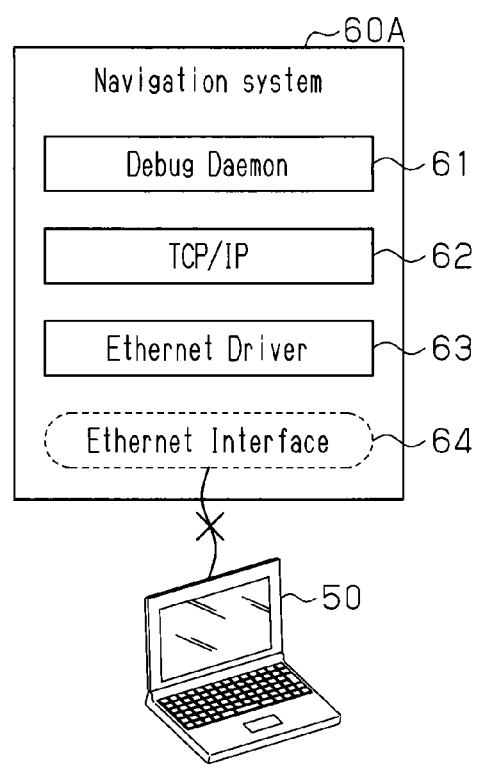

The embodiment described above exemplifies a case where the USB memory 40 and the debug device 50 are separate from each other. However, besides it, the USB memory and the debug device may be combined into an integral device in which they share the terminals to be connected to the connection terminals of the navigation system 20. For example, as shown in FIGS. 11(a) and 11(b), the integral device 51 may have a USB memory unit 40A and a debug device unit 50A, and a common terminal 51a of the integral device 51 may be connected to the USB interface 27A of the navigation system 20. First, as shown in FIG. 11(a), the storage device-use driver 25 in the navigation system 20 acquires the serial communication driver 23 from the USB memory unit 40A via the common terminal 51a. Then, the navigation system 20 may validate the serial communication driver 23 to switch the connection destination by way of the common terminal 51a from the USB memory unit 40A to the debug device unit 50A in the integral device 51 so that the debug daemon 21 can communicate data with the debug device unit 50A. Also if the connection destination by way of the common terminal 51a is switched from the USB memory 40 to the debug device unit 50A, the navigation system 20 detects detachment of the USB memory 40. In this case, by presetting the navigation system 20 so that the processing to disconnect the communication path between the debug daemon 21 and the debug device unit 50A may not be performed, the communication path between the debug daemon 21 and the debug device unit 50A is ensured appropriately. As a result, at least one of the connection terminals of the navigation system 20 can safely connect the USB memory unit 40A and the debug device unit 50A to the navigation system 20 as necessary, so that the online debug system can be applied. Moreover, it is possible to facilitate the management of the integral device 51, that is, the storage device and the debug device combined into one position, thereby improving the degree of freedom and the utility value of the configuration of the online debug system for an information processing device.

The embodiment described above exemplifies a case where the information processing device is the navigation system 20. However, besides it, the information processing device may be any vehicle control device mounted in a vehicle or a control device for controlling an acoustic product. This permits the online debug system to be broadly applied to the vehicle-mounted instruments.

Further, the present online debug system for an information processing device may be applied not only to a vehicle-mounted information processing device such as a navigation system, but also to an information processing device from which a debugging communication path is removed after the development in order to reduce its size and costs as a product of the information processing device itself.

DESCRIPTION OF REFERENCE NUMERALS

10 Vehicle
11 Vehicle Ecu
12 Sensor
15 Display Screen
16 Speaker
20 Navigation System
21 Debug Daemon
22 TCP/IP
23, 23C Serial Communication Driver
24 Data Expansion Unit
25 Memory Device-Use Driver
26 USB Host
27 USB Plug
27A, 27B USB Interface
27C CAN Interface
30 USB Hub
30A First Connection Terminal
30B Second Connection Terminal
40 USB Memory
40A USB Memory Unit
40R Communication Path
41 Search Table
42 PPP
43 CDC_ACM
50 Debug Device
50A Debug Device Unit
50R Communication path
51 Integral Device
60A, 60B Navigation System
61 Debug Daemon
62 TCP/IP
63 Ethernet Driver
64 Ethernet Interface
115 Communication Driver Group

The invention claimed is:

1. An online debug system for an information processing device, the system comprising:
an information processing device and a debug device for debugging the information processing device online from outside,
the information processing device has a connection terminal to which a storage device is connected so that the information processing device can acquire data stored in the storage device,
the information processing device has a debug performing unit for debugging software to be executed in the information processing device based on a directive from the outside and a data expansion unit for validating the data read from the storage device,
the data stored in the storage device has a communication driver group that permits the debug performing unit to communicate with the outside via the connection terminal, and
when the communication driver group is read from the storage device connected to the connection terminal and validated by the data expansion unit, the validated communication driver group enables communication between the debug performing unit and the debug device that is connected to the connection terminal and transfers the directive from outside of the information processing device,
wherein the data stored in the storage device has a list denoting the communication driver group that corresponds to the information processing device and the communication driver groups registered in the list, and
the data expansion unit references the list to select the communication driver group that is specified as corresponding to the information processing device, reads the selected communication driver group from the storage device, and validates the selected communication driver group.

2. The online debug system for an information processing device according to claim 1, wherein the connection terminal is expanded to a first connection terminal and a second connection terminal, so that, when the storage device is connected to the first connection terminal, the communication driver group read from the storage device into the information processing device is validated for the second connection terminal and the debug device is connected to the second connection terminal.

3. The online debug system for an information processing device according to claim 2, wherein the connection terminal of the information processing device is of the USB standard, and a USB hub connected to the connection terminal is provided with the first connection terminal and the second connection terminal.

4. The online debug system for an information processing device according to claim 1, wherein the storage device and the debug device are configured as an integral device in which they share a terminal to be connected to the connection terminal.

5. The online debug system for an information processing device according to claim 1, wherein the connection terminal is of the serial bus standard.

6. An online debug system for an information processing device, the system comprising:
an information processing device and a debug device for debugging the information processing device online from outside,
the information processing device has a connection terminal to which a storage device is connected so that the information processing device can acquire data stored in the storage device,
the information processing device has a debug performing unit for debugging software to be executed in the information processing device based on a directive from the outside and a data expansion unit for validating the data read from the storage device,
the data stored in the storage device has a communication driver group that permits the debug performing unit to communicate with the outside via the connection terminal, and
when the communication driver group is read from the storage device connected to the connection terminal and validated by the data expansion unit, the validated communication driver group enables communication between the debug performing unit and the debug device that is connected to the connection terminal and transfers the directive from outside of the information processing device,
wherein the connection terminal is composed of a first connection terminal and a second connection terminal that can be used simultaneously, so that, when the storage device is connected to the first connection terminal, the communication driver group read from the storage device into the information processing device is validated for the second connection terminal and the debug device is connected to the second connection terminal.

7. The online debug system for an information processing device according to claim 6, wherein, when the storage device is detached from the first connection terminal, communication is canceled between the debug performing unit and the debug device connected to the second connection terminal, and the communication driver group is invalidated for the second connection terminal.

8. An online debug system for an information processing device, the system comprising:
an information processing device and a debug device for debugging the information processing device online from outside,
the information processing device has a connection terminal to which a storage device is connected so that the information processing device can acquire data stored in the storage device,
the information processing device has a debug performing unit for debugging software to be executed in the information processing device based on a directive from the outside and a data expansion unit for validating the data read from the storage device,
the data stored in the storage device has a communication driver group that permits the debug performing unit to communicate with the outside via the connection terminal, and
when the communication driver group is read from the storage device connected to the connection terminal and validated by the data expansion unit, the validated communication driver group enables communication between the debug performing unit and the debug device that is connected to the connection terminal and transfers the directive from outside of the information processing device,
wherein the information processing device is mounted in a vehicle as a vehicle-mounted information processing device.

9. An online debug method for an information processing device, the method enabling debugging on the information processing device online based on a directive transferred from an outside debug device, the information processing device having a connection terminal to which a storage device is connected so that the information processing device can acquire data stored in the storage device, the method comprising:

provinding the information processing device beforehand with a debug performing unit for debugging software to be executed in the information processing device based on the directive from the outside and a data expansion unit for validating the data read from the storage device, and also storing, in the storage device beforehand, a communication driver group that permits the debug performing unit to communicate with the outside via the connection terminal;

validating the communication driver group read by the data expansion unit from the storage device connected to the connection terminal; and enabling communication between the debug device and the debug performing unit by using the validated communication driver group, wherein the information processing device is mounted in a vehicle as a vehicle-mounted information processing device.

10. An online debug method for an information processing device, the method enabling debugging on the information processing device online based on a directive transferred from an outside debug device, the information processing device having a connection terminal to which a storage device is connected so that the information processing device can acquire data stored in the storage device, the method comprising:

providing the information processing device beforehand with a debug performing unit for debugging software to be executed in the information processing device based on the directive from the outside and a data expansion unit for validating the data read from the storage device, and also storing, in the storage device beforehand, a communication driver group that permits the debug performing unit to communicate with the outside via the connection terminal;

validating the communication driver group read by the data expansion unit from the storage device connected to the connection terminal;

enabling communication between the debug device and the debug performing unit by using the validated communication driver group;

storing, in the storage device beforehand, a list denoting the communication driver group that corresponds to the information processing device and the communication driver groups registered in the list, and causing the data expansion unit to reference the list to thereby select the communication driver group that is specified as corresponding to the information processing device, read the selected communication driver group from the storage device, and validate the selected communication driver group.

11. An online debug method for an information processing device, the method enabling debugging on the information processing device online based on a directive transferred from an outside debug device, the information processing device having a connection terminal to which a storage device is connected so that the information processing device can acquire data stored in the storage device, the method comprising:

providing the information processing device beforehand with a debug performing unit for debugging software to be executed in the information processing device based on the directive from the outside and a data expansion unit for validating the data read from the storage device, and also storing, in the storage device beforehand, a communication driver group that permits the debug performing unit to communicate with the outside via the connection terminal;

validating the communication driver group read by the data expansion unit from the storage device connected to the connection terminal;

enabling communication between the debug device and the debug performing unit by using the validated communication driver group;

preparing a first connection terminal and a second connection terminal as the connection terminal;

connecting the storage device to the first connection terminal to thereby validate, for the second connection terminal, the communication driver group read from the storage device into the information processing device; and connecting the debug device to the second connection terminal.

12. The online debug method for an information processing device according to claim 11, the method comprising:

detaching the storage device from the first connection terminal to thereby cancel communication between the debug performing unit and the debug device connected to the second connection terminal, and invalidating the communication driver group for the second connection terminal.

* * * * *